(12) United States Patent
Barkdoll

(10) Patent No.: US 7,191,677 B2
(45) Date of Patent: Mar. 20, 2007

(54) ADJUSTABLE ANGLE DRIVE FOR A ROTARY POWER TOOL

(75) Inventor: Patrick J. Barkdoll, Pecatonica, IL (US)

(73) Assignee: Nomis LLC, Hampshire, IL (US)

( * ) Notice: Subject to any disclaimer, the term of this patent is extended or adjusted under 35 U.S.C. 154(b) by 356 days.

(21) Appl. No.: 10/367,469

(22) Filed: Feb. 14, 2003

(65) Prior Publication Data
US 2004/0159172 A1   Aug. 19, 2004

(51) Int. Cl.
*F16C 35/06* (2006.01)
*B25B 17/00* (2006.01)

(52) U.S. Cl. .......................... 74/396; 74/417; 173/216; 81/57.26; 81/57.28

(58) Field of Classification Search ............. 81/53.12, 81/472–478, 480, 446, 449, 450, 57.12, 57.26, 81/57.28; 74/423, 395–6, 416–7, 420; 403/4, 403/17, 19, 86, 110–1.131; 173/28, 48, 216, 173/217
See application file for complete search history.

(56) References Cited

U.S. PATENT DOCUMENTS

| | | | | |
|---|---|---|---|---|
| 1,379,880 A | * | 5/1921 | Seaborn ..................... 433/130 |
| 1,414,207 A | * | 4/1922 | Reed ............................. 285/2 |
| 1,525,091 A | * | 2/1925 | Savidge .................... 74/665 R |
| 1,688,410 A | | 10/1928 | Chayes et al. |
| 1,750,957 A | * | 3/1930 | Fowler ........................ 74/425 |
| 2,194,062 A | | 3/1940 | Alberston et al. |
| 2,348,266 A | * | 5/1944 | Selby ........................... 74/417 |
| 2,465,309 A | | 3/1949 | Happe et al. |
| 2,545,659 A | * | 3/1951 | Ginter ......................... 16/426 |
| 2,553,416 A | * | 5/1951 | Koett ........................... 74/385 |
| 2,563,582 A | * | 8/1951 | Colucci et al. ............. 451/415 |
| 2,589,822 A | | 3/1952 | Kostka |
| 2,604,795 A | * | 7/1952 | Ristow ........................ 74/417 |
| 2,620,840 A | | 12/1952 | Schafer |
| 2,669,162 A | * | 2/1954 | Arliss .......................... 409/144 |
| 2,780,942 A | * | 2/1957 | Babcock ....................... 74/417 |
| 3,456,458 A | * | 7/1969 | Dixon ......................... 464/109 |
| 3,724,561 A | * | 4/1973 | Merrels ......................... 173/50 |
| 4,332,147 A | * | 6/1982 | Grech .......................... 464/109 |
| 4,368,556 A | * | 1/1983 | Wanner et al. ................ 16/436 |
| 4,643,052 A | * | 2/1987 | Badiali ...................... 81/57.28 |
| RE32,415 E | | 5/1987 | Grech |
| 4,912,349 A | * | 3/1990 | Chang .......................... 310/50 |
| 5,533,581 A | * | 7/1996 | Barth et al. ................. 173/216 |
| 5,863,159 A | * | 1/1999 | Lasko .......................... 408/124 |
| 6,089,331 A | | 7/2000 | Christ |
| 6,125,721 A | | 10/2000 | Yang |
| 6,352,127 B1 | * | 3/2002 | Yorde ......................... 173/216 |

FOREIGN PATENT DOCUMENTS

| | | | |
|---|---|---|---|
| DE | 36 34 734 | * | 4/1988 |
| DE | 295 12 161 | * | 1/1997 |
| DE | 100 01 091 | * | 7/2001 |

* cited by examiner

*Primary Examiner*—William C. Joyce
(74) *Attorney, Agent, or Firm*—Reinhart Boerner Van Deuren P.C.

(57) ABSTRACT

The present invention provides an adjustable angle drive for a rotary power tool such as a drill. The adjustable angle drive includes input and output shafts journalled for rotation in input and output housings. The input and output shafts are rotatably coupled through gearing and are adjustable among different angular positions.

34 Claims, 6 Drawing Sheets

US 7,191,677 B2

ADJUSTABLE ANGLE DRIVE FOR A ROTARY POWER TOOL

FIELD OF THE INVENTION

This invention pertains to angular power transmitting devices and more particularly to adjustable angle drive transmissions for rotary power tools such as a rotary power drill for example.

BACKGROUND OF THE INVENTION

Right angle drives, such as generally exemplified in U.S. Pat. No. 2,620,840, are commonly used in rotary power drill applications to convert the axis of rotation by 90 degrees. Right angle drives are useful in a number of situations where it is difficult to orient or manipulate the drill into alignment with the working surface or where impediments make it hard for the drill to reach the desired location. Such right angle drives are relatively simple in construction and can be readily used with all or most commercially available rotary drills. Right angle drives can be readily attached and detached from the chucks of rotary drills to allow for quick adaptation of the drill. The problem with right angle drives is that the angle of such drives are fixed at 90 degrees. Either a workman can drill at a straight angle (0 degrees) or the workman can drill at a right angle (90 degrees), but not angles therebetween. Although right angle drives increase the ergonomics of drills by providing an additional angular drilling option, the problem with right angle drives is that they are still limited in that a workman only has two fixed angles to select between which insufficient and undesirable for many hard to reach spots or impediments. There are many drilling applications in which various intermediate angles of between 0 and 90 degrees would be beneficial.

An attempt at an adjustable power transmitting device for a drill is disclosed in Grech, U.S. Pat. No. 4,332,147 (Re. 32,415). To Applicant's knowledge, this device has not met with commercial acceptance and is not commercially available. There appears to be several drawbacks and impracticalities related to this disclosed device. Most notably, this device appears to require fastening of the device to the drill body. Thus, the device would not appear to be readily usable with many commercially available drills and in fact would be limited to only drills having suitable mounting capabilities. Several other drawbacks and problems with Grech will become readily apparent with an appreciation of the various aspects of Applicant's invention.

BRIEF SUMMARY OF THE INVENTION

The invention provides an adjustable angle drive for a rotary drill having several different inventive aspects.

According to one aspect of the present invention, the invention is directed toward an adjustable angle drive for a rotary tool having an adjustment axis that is oblique relative to input and output axes. According to this aspect, an adjustable angle drive comprises an input shaft journalled to an input housing for rotation about an input axis and an output shaft journalled to the output housing for rotation about an output axis. Between the input and output housings is a circular interface that is concentric about an adjustment axis. The adjustment axis is oblique relative to the input and output axes such that the input housing and the output housing rotate relative to each other about the adjustment axis to adjust the angle between the input shaft and the output shaft. Gearing rotatably couples the input and output shafts together such that the input and output shafts rotate in unison.

According to another aspect of the present invention, the invention is directed toward an adjustable angle drive having a clamp that can be selectively secured and released to selectively fix or adjust the relative angular positions between input and output shafts. According to this aspect, an adjustable angle drive comprises an input shaft journalled to an input housing for rotation about an input axis and an output shaft journalled to the output housing for rotation about an output axis. A clamp releasably secures the input and output housings together and thereby fixing the input and output shafts at an angular position relative to each other. The input and output shafts are adjustable among a plurality of positions between two angular positions when the clamp is released thereby allowing movement between the input and output housings. Gearing rotatably couples the input and output shafts together such that the input and output shafts rotate in unison.

According to another aspect of the present invention, the invention is directed toward an adjustable angle drive having an adjustable handle that can be selectively located as the angle of the angular adjustable drive is adjusted. According to this aspect, an adjustable angle drive comprises an input shaft journalled to an input housing for rotation about an input axis and an output shaft journalled to the output housing for rotation about an output axis. Gearing rotatably couples the input and output shafts together such that the input and output shafts rotate in unison. A handle is supported by and projects outward from the input housing and/or the output housing to provide a gripping surface to allow for manipulation of the adjustable angle drive. The handle is movable among a plurality of positions relative to the input and output housings.

DETAILED DESCRIPTION OF THE INVENTION

Figure 1:
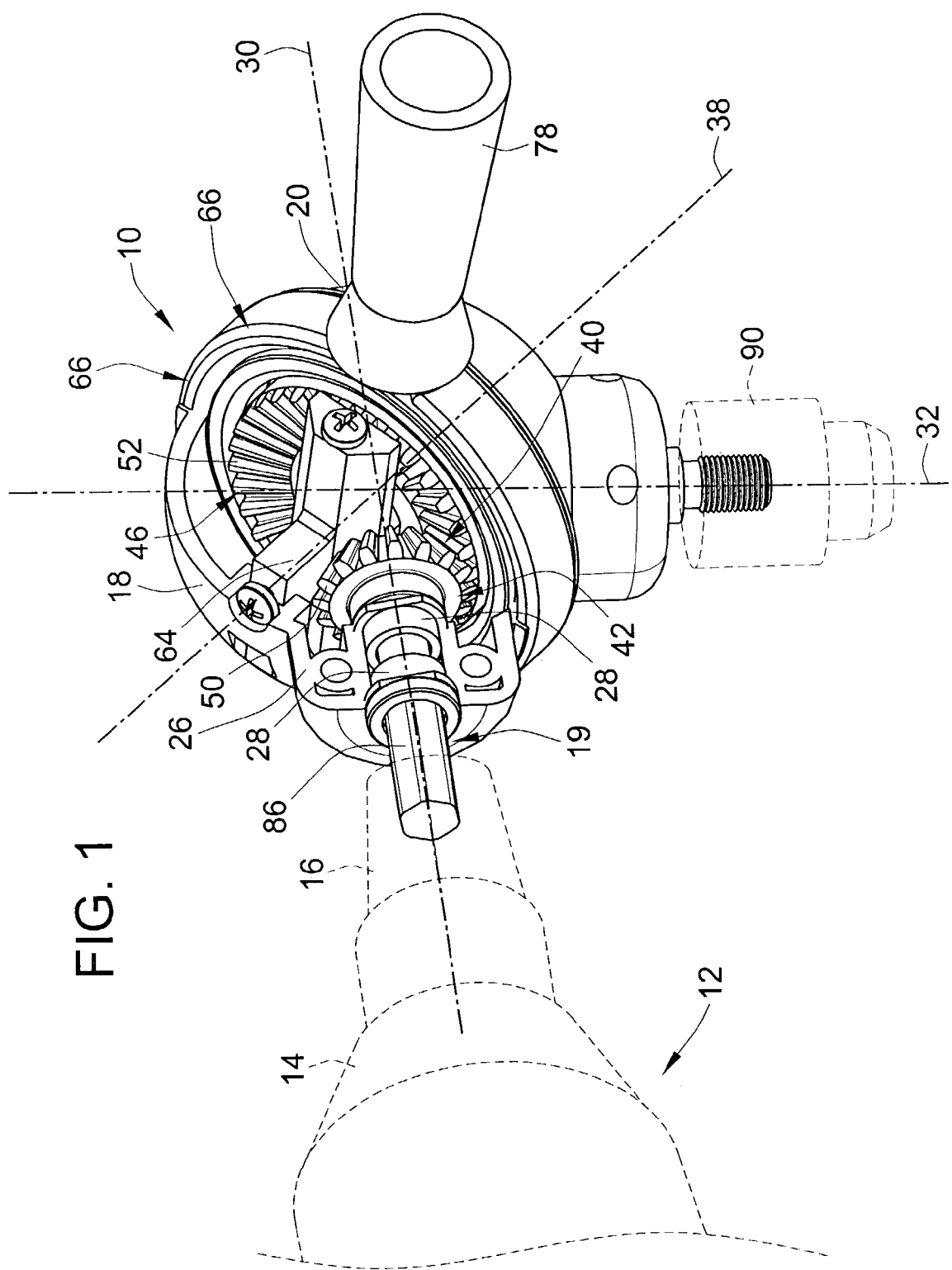
FIG. 1 is an isometric illustration of an adjustable angle drive according to an embodiment of the present invention, with a section of the housing being cut away to expose the inside of the adjustable angle drive.
Figure 2:
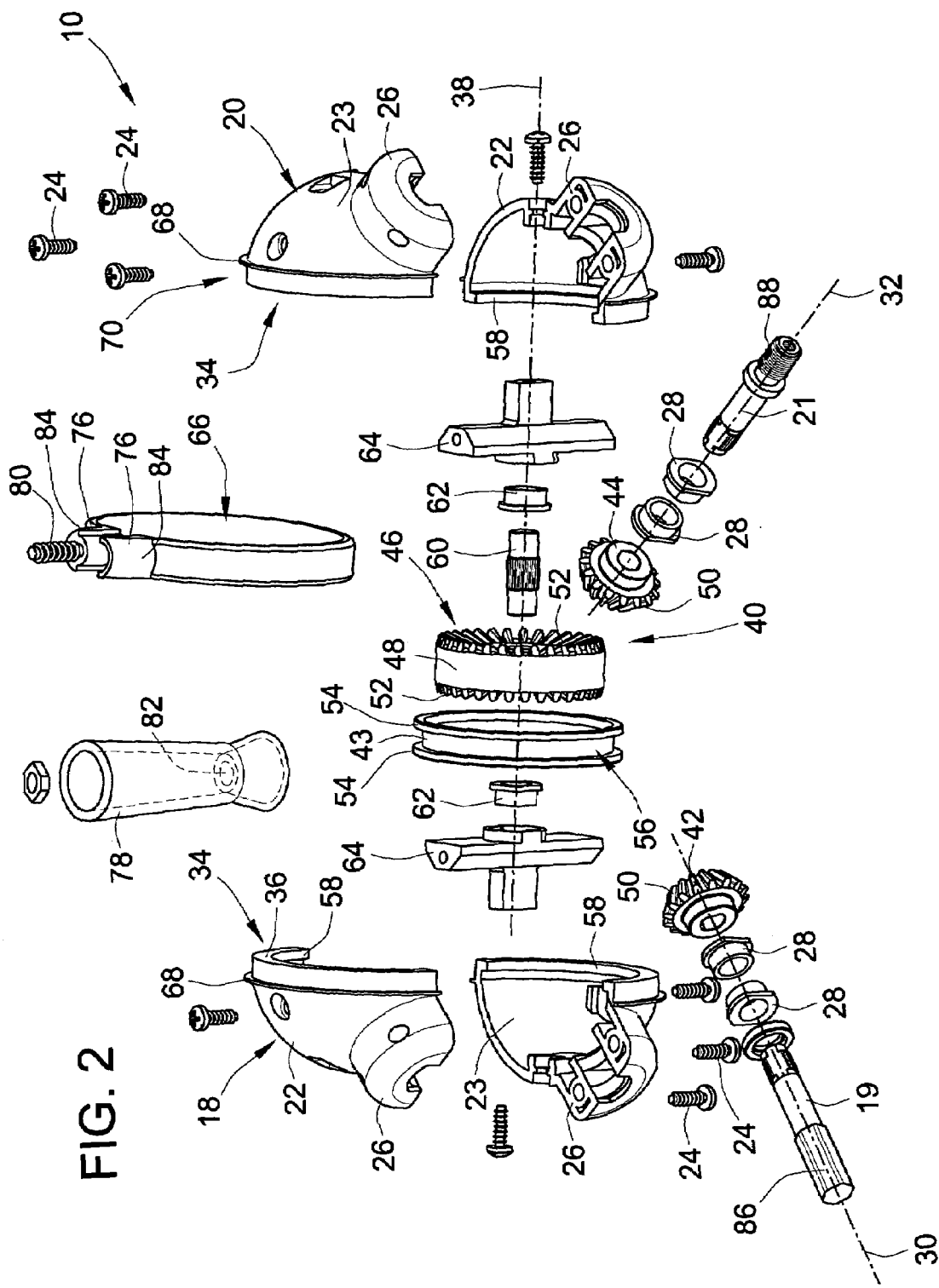
FIG. 2 is an exploded assembly view of the adjustable angle drive shown in FIG. 1.
Figure 3:
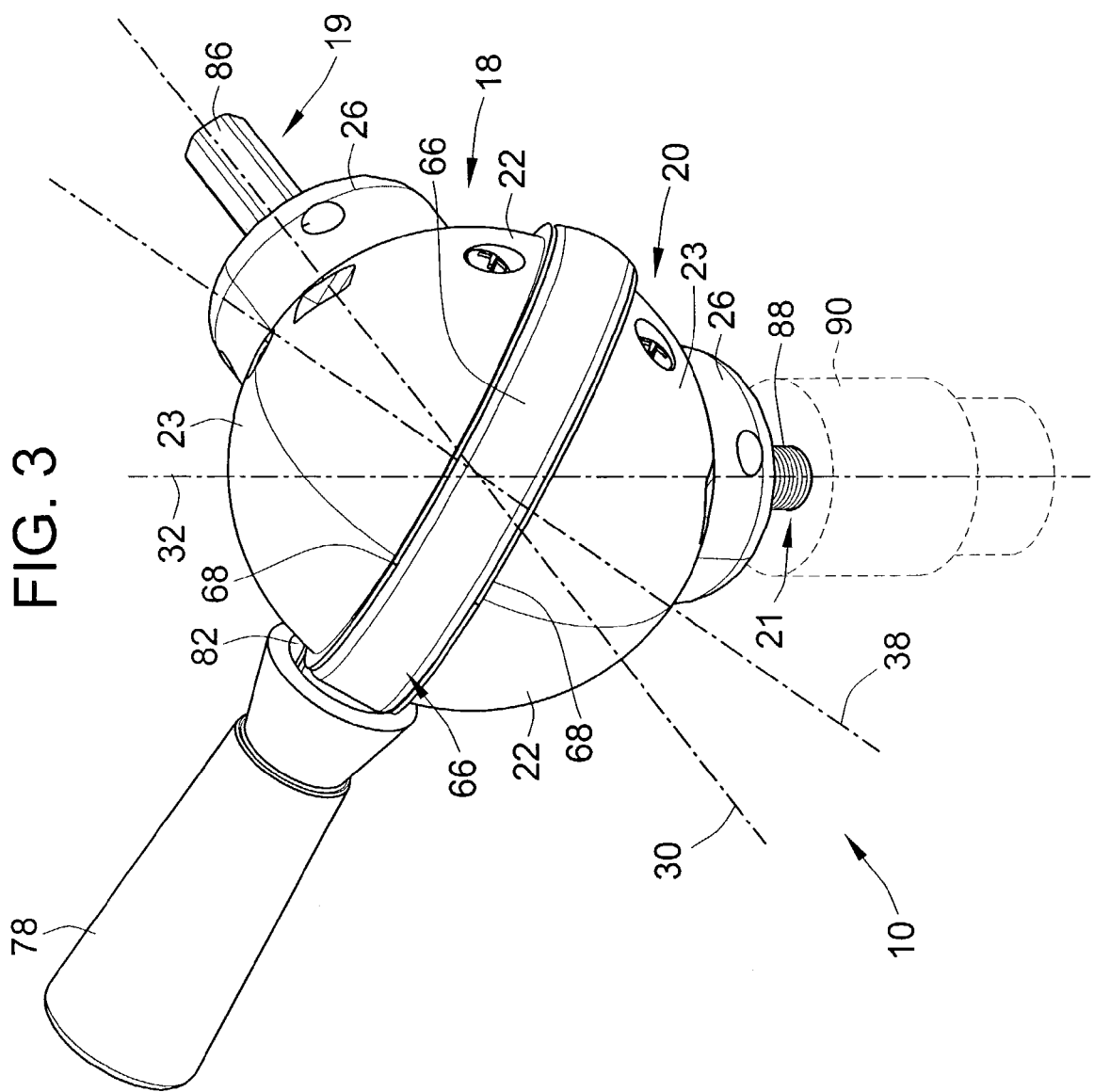
FIGS. 3–6 are isometric illustrations of the adjustable angled drive shown in FIG. 1 shown in different angular positions.
Figure 4:
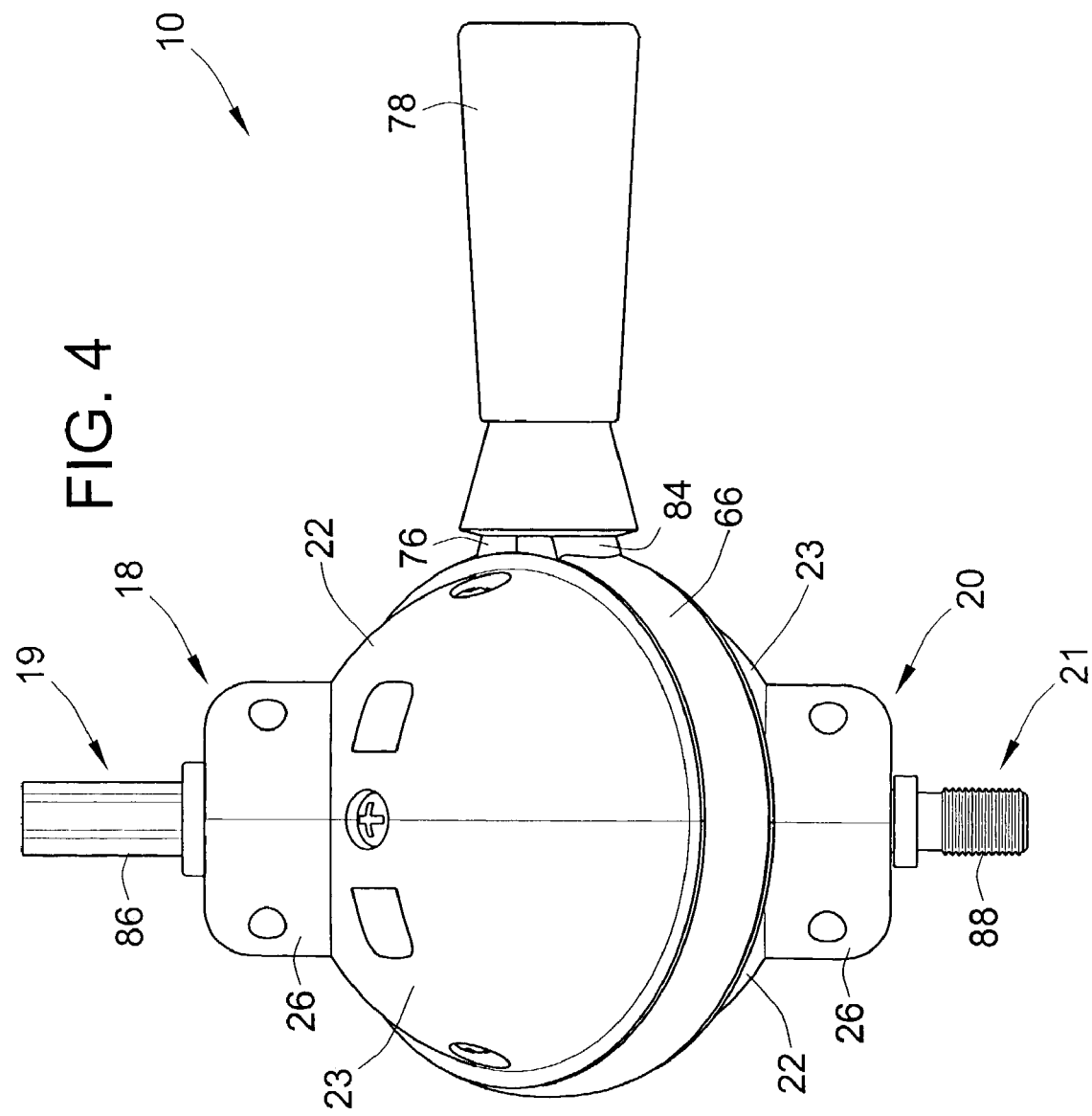
Figure 5:
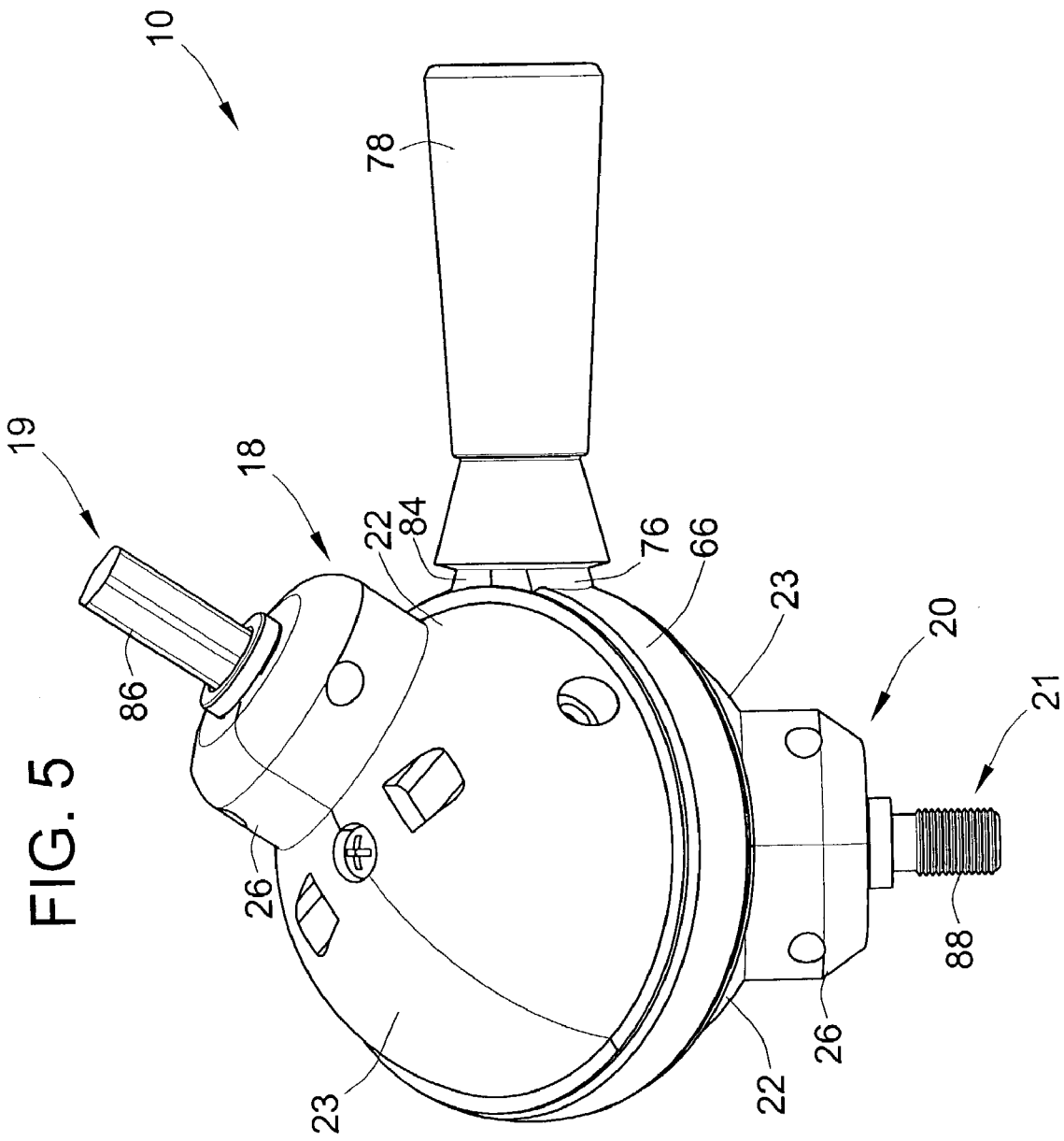
Figure 6:
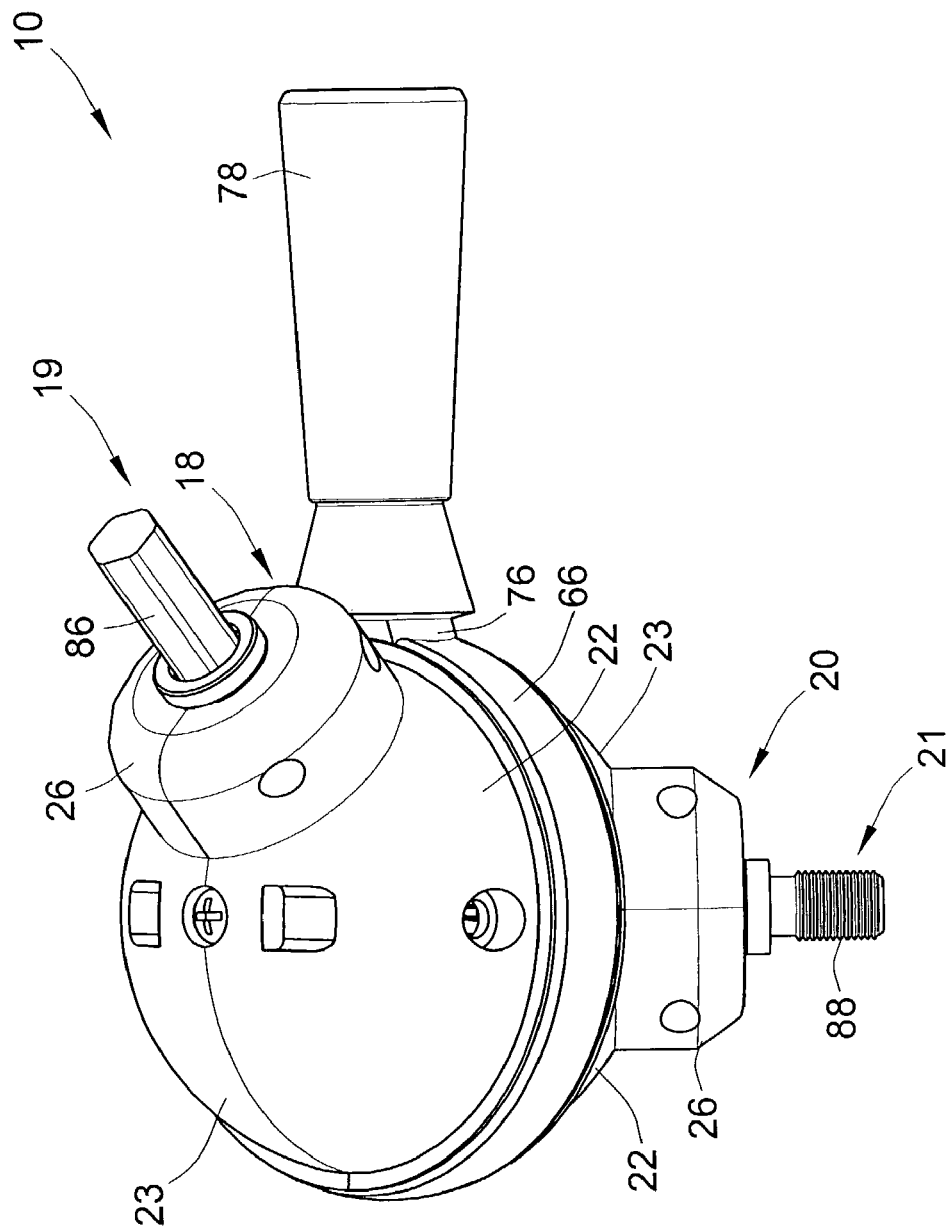

The following detailed description of embodiments of the present invention further illustrate the invention but, of course, should not be construed as in any way limiting its scope.

Referring to the figures, an adjustable angle drive 10 for a rotary drill 12 or other rotary power tool is illustrated. The rotary drill 12 comprises a drill body 14 and generates a rotary output through a conventional chuck 16. The angle drive 10 is shown as an attachable and detachable component for the rotary drill 12 that readily attaches and detaches to the output chuck 16.

The angle drive 10 comprises an input housing 18 and an output housing 20 which carry a steel input shaft 19 and a steel output shaft 21, respectively. The input housing and output housings 18, 20 are comprised of a pair of hard plastic shells 22, 23 that can be fastened together via a screw 24 to form when combined hemispherical shells that can be used for either the output housing or the input housing. The housings 18, 20 define internal cylindrical support structures 26 that support brass bushing elements 28 that serve to journal the input and output shafts 19, 21.

The bushing elements 28 align the input and output shafts 19, 21 along input and output axes 30, 32 and allow rotation of the input and output shafts 19, 21 relative to the input and output housings 18, 20 about the respective shaft axes 30, 32. In the alternative to bushing elements 28, bearings or other suitable support surfaces or structures that facilitate rotation may be used.

The input and output housings 18, 20 slide and rotate relative to each other along a circular contact interface 34 that includes cooperating radially planar surfaces 36 on the input and output housings 18, 20 that are directly in contact and/or in indirect contact through an intermediate component (e.g. such as through intermediate gear 46 for example). The sliding and rotation occur about an adjustment axis 38 that is skewed at an oblique angle relative to the input and output shaft axes 30, 32. With this arrangement, the angle between the input shaft axis 30 and the output shaft axis 32 are selectively adjustable among various angular positions between 0° and 90° through relative rotation between input and output housings 18, 20 about the adjustment axis 38. With radially planar surfaces infinite adjustment between 0° and 90° is available. Alternatively, the circular contact interface 34 may include detents or cooperating detented or notched surfaces to provide discrete angular positions between the input shaft axis 30 and the output shaft axis 32 rather than infinite adjustment.

Gearing 40 comprised of two or more gears transmits rotation between the input and output shafts 19, 21. In the disclosed embodiment, the gearing 40 is comprised of three gears including a first pinion gear 42 mounted to an end of the input shaft 19, a second pinion gear 44 mounted to an end of the output shaft 21, and an intermediate gear 46. The pinion gears 42, 44 have gear teeth about a conical gear face 50. The intermediate gear 46 is double sided and comprises a circular plate shaped gear body 48 with two gear faces 52 on opposite sides of the body 48 that include teeth which interact with the teeth on the pinion gears 42, 44.

The gear body 48 of the intermediate gear 46 also is supported by a tubular support ring 43. The support ring 43 provides a pair of parallel circular alignment rings 54 that project radial outward and define a ring shaped channel 56. The input and output housings 18, 20 define radially inward projecting ring shaped shelves 58 that fit into and fill the ring shaped channel 56 to retain and align the support ring and thereby align the intermediate gear 46 generally concentric about the adjustment axis 38. The intermediate gear 46 is mounted on a center gear shaft 60 that is aligned along the adjustment axis 38. To center gear shaft 60 the ends of the shaft 60 are supported by a pair shaft support elements 64 that are respectively fastened to the input and output housings 18, 20. The shaft support elements 64 carry bushing elements 62 that journal the center gear shaft 60 and thereby allow the gear shaft 60 and intermediate gear 46 to freely rotate about the adjustment axis 38.

The use of the double sided intermediate gear 46 allows the pinion gears 42, 44 to mesh with the gear faces 52 on opposite sides of the intermediate gear at different angular positions. This allows the input and output housings 18, 20 to be rotated relative to each other to adjust the angle between input and output shafts 19, 21.

A clamp show in the form of a plastic ring clamp 66 is provided to releasably secure the input and output housings 18, 20 together to set an angle between the input and output shafts 19, 21. The ring clamp 66 can be loosened to allow for angular adjustment between the input and output shafts 19, 21 or tightened to secure the input and output housings 18, 20 and thereby set the angle between the input and output shafts 19, 21.

The ring clamp 66 surrounds the outer peripheral surface of the housings 18, 20. The housings 18, 20 define radially outward projecting ribs 68 that define an annular channel 70 that receives and retains the ring clamp 66. The abutting ends of ring clamp 66 include a conically shaped tab 76 that in combination provide for a conical boss for attachment of a handle 78. A threaded bolt 80 is mounted to and projects outward from one of the tabs 76. The handle 78 includes a threaded orifice that screws onto the threaded bolt 80. The handle 78 also includes a cavity 82 that slides over and engages the conical tabs 76. The conical tabs 76 include an outer conical cam surface 84 that engage the handle cavity 82. As the handle 78 is screwed onto the bolt 80 the handle cavity 82 drives the conical tabs 76 together to secure and clamp the input and output housings 18, 20 together. The handle 78 can be unscrewed partially to release the ring clamp 66 and thereby allow for angular adjustment between the input and output shafts.

In addition, the ring clamp 66 provides for selective positioning of the handle 78 about the input and output housings 18, 20. Specifically, while the ring clamp 66 is in the released state, the entire ring clamp 66 can be rotated about the adjustment axis 38 in the outer annular channel 70. As the ring clamp 66 is rotated the position of the handle is moved as well. This advantageously provides for selective ergonomic placement of the handle 78 so that the handle 78 can be located at a convenient location for the worker to grasp handle 78 and thereby manipulate the adjustable angle drive 10.

The adjustable angle drive 10 is shown for use as an accessory for a power drill 12. For this application, the input shaft 19 is provided with a chuckable end 86 that can be readily gripped by the output chuck 16 of the drill. The output shaft 21 has a threaded stem 88 that is adapted to be connected to a drill chuck 90.

It is an advantage that the angle drive 10 need not be physically attached to the drill body 14 and thus the angle drive 10 can advantageously be used with most existing drills and other rotary power tools existing and that are commercially available. However, it is also envisioned that the adjustable angle drive may be integrally incorporated into the end of a drill rather than as a separate component. The adjustable angle drive 10 may also be used in other rotary power applications beyond rotary drill applications. Certain broader claims appended hereto are meant to encompass these and other possibilities.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or therwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An adjustable angle drive attachment releasably connectable to and usable with a rotary tool, the adjustable angle drive attachment comprising:
    an input housing;
    an output housing;
    an input shaft having a chuckable free end not part of the rotary tool and journalled to the input housing for rotation about an input axis;
    an output shaft journalled to the output housing for rotation about an output axis;
    a circular interface between the input housing and the output housing concentric about an adjustment axis that is oblique relative to the input and output axes, the input housing and the output housing rotating relative to each other about the adjustment axis to adjust the angle between the input shaft and the output shaft;
    gearing rotatably coupling the input and output shafts such that the input and output shafts rotate in unison;
    an input gear on the input shaft;
    an output gear on the output shaft;
    an intermediate transmission gear including a first gear face meshing with the input gear and a second gear face meshing with the output gear, the transmission gear mounted for rotation about the adjustment axis between the input and output axes to transmit rotation between the input and output shafts;
    a transmission shaft having a first and second ends earned by the input and output housings, respectively, the transmission shaft supporting the intermediate transmission gear between the first and second ends; and
    wherein the first and second ends of the transmission shaft are journalled to the input and output housings, respectively.

2. The adjustable angle drive attachment of claim 1 wherein the output shaft is adjustable relative to the input shaft only about the adjustment axis.

3. The adjustable angle drive attachment of claim 1 wherein the input and output housings are hemispherical shells slidably contacting each other at the circular interface.

4. An adjustable angle drive attachment releasably connectable to and usable with a rotary tool, the adjustable angle drive attachment comprising:
    an input housing;
    an output housing;
    an input shaft having a chuckable free end not part of the rotary tool and journalled to the input housing for rotation about an input axis;
    an output shaft journalled to the output housing for rotation about an output axis;
    a circular interface between the input housing and the output housing concentric about an adjustment axis that is oblique relative to the input and output axes, the input housing and the output housing rotating relative to each other about the adjustment axis to adjust the angle between the input shaft and the output shaft;
    gearing rotatably coupling the input and output shafts such that the input and output shafts rotate in unison; and
    a clamp releasably securing the input and output housings together.

5. The adjustable angle drive attachment of claim 4 wherein the input and output shafts are infinitely adjustable between two angular positions relative to each other.

6. The adjustable angle drive attachment of claim 5 wherein the input shaft and the output shaft are infinitely adjustable between about 90 degrees and about 180 degrees.

7. The adjustable angle drive attachment of claim 4 wherein the clamp is a ring clamp surrounding the circular interface, the ring clamp engaging the input and output housings.

8. The adjustable angle drive attachment of claim 7 further comprising a handle threadingly engaging the ring clamp and being rotatable to adjust the diameter of the ring clamp selectively clamp or release the input and output housings.

9. The adjustable angle drive attachment of claim 8 wherein the ring clamp is rotatable radially about the circular interface adjusting the position of the handle relative to the input and output housings wherein the handle is selectively positionable relative to the output shaft.

10. An adjustable angle drive attachment releasably connectable to and usable with a rotary tool, the adjustable angle drive attachment comprising:
    an input housing;
    an output housing movable relative to the input housing;
    an input shaft having a chuckable free end not part of the rotary tool and journalled to the input housing for rotation about an input axis;
    an output shaft journalled to the output housing for rotation about an output axis;
    an expandable ring clamp releasably securing the input and output housings together and thereby fixing the input and output shafts at an angular position relative to each other, wherein the input and output shafts are adjustable among a plurality of positions between two angular positions relative to each other when the clamp is released allowing movement between the input and output housings;
    gearing rotatably coupling the input and output shafts such that the input and output shafts rotate in unison; and
    a circular interface between the input housing and the output housing concentric about an adjustment axis that is oblique relative to the input and output axes, the input housing and the output housing rotating relative to each other about the adjustment axis to adjust the angle between the input shaft and the output shaft.

11. The adjustable angle drive attachment of claim 10 wherein said gearing comprises:
an input gear on the input shaft;
an output gear on the output shaft; and
an intermediate transmission gear including a first gear face meshing with the input gear and a second gear face meshing with the output gear, the transmission gear mounted for rotation about the adjustment axis between the input and output axes to transmit rotation between the input and output shafts.

12. The adjustable angle drive attachment of claim 10 wherein the input and output shafts are infinitely adjustable between two angular positions relative to each other.

13. The adjustable angle drive attachment of claim 12 wherein the input shaft and the output shaft are infinitely adjustable between about 90 degrees and about 180 degrees.

14. The adjustable angle drive attachment of claim 10 wherein the ring clamp surrounds the circular interface, the ring clamp engaging the input and output housings.

15. The adjustable angle drive attachment of claim 14 further comprising a handle threadingly engaging the ring clamp and being rotatable to adjust the diameter of the ring clamp selectively clamp or release the input and output housings.

16. The adjustable angle drive attachment of claim 15 wherein the ring clamp is rotatable radially about the circular interface adjusting the position of the handle relative to the input and output housings wherein the handle is selectively positionable relative to the output shaft.

17. The adjustable angle drive attachment of claim 10 further comprising a chuck mounted to the output shaft, the chuck having an adjustable orifice adapted to connect to the work tool and other work tools.

18. The adjustable angle drive attachment of claim 10 wherein the output shaft is adjustable relative to the input shaft only about the adjustment axis.

19. The adjustable angle drive attachment of claim 10 wherein the input and output housings are hemispherical shells slidably contacting each other at the circular interface.

20. An adjustable angle drive comprising:
an input housing;
an output housing movable relative to the input housing;
an input shaft journalled to the input housing for rotation about an input axis;
an output shaft journalled to the output housing for rotation about an output axis;
a clamp releasably securing the input and output housings together and thereby fixing the input and output shafts at an angular position relative to each other, wherein the input and output shafts are adjustable among a plurality of positions between two angular positions relative to each other when the clamp is released allowing movement between the input and output housings;
gearing rotatably coupling the input and output shafts such that the input and output shafts rotate in unison;
an input gear on the input shaft;
an output gear on the output shaft;
an intermediate transmission gear including a first gear face meshing with the input gear and a second gear face meshing with the output gear, the transmission gear mounted for rotation about the adjustment axis between the input and output axes to transmit rotation between the input and output shafts; and
a transmission shaft having a first and second ends carried by the input and output housings, respectively, the transmission shaft supporting the intermediate transmission gear between the first and second ends.

21. The adjustable angle drive of claim 20 wherein the first and second ends of the transmission shaft are journalled to the input and output housings, respectively.

22. An adjustable angle drive attachment releasably connectable to and usable with a rotary tool, the adjustable angle drive attachment comprising:
an input housing;
an output housing movable relative to the input housing;
an input shaft having a chuckable free end not part of the rotary tool and journalled to the input housing for rotation about an input axis;
an output shaft journalled to the output housing for rotation about an output axis, the output shaft movable relative to the input shaft between two angular boundary positions and intermediate angular positions between said boundary positions;
a handle projecting radially outward from at least one of the input housing and the output housing, the handle being movable among a plurality of positions and more than two positions relative to the input and output housings;
gearing rotatably coupling the input and output shafts such that the input and output shafts rotate in unison; and
a circular interface between the input housing and the output housing concentric about an adjustment axis that is oblique relative to the input and output axes, the input housing and the output housing rotating relative to each other about the adjustment axis to adjust the angle between the input shaft and the output shaft.

23. The adjustable angle drive attachment of claim 22 wherein said gearing comprises:
an input gear on the input shaft;
an output gear on the output shaft; and
an intermediate transmission gear including a first gear face meshing with the input gear and a second gear face meshing with the output gear, the transmission gear mounted for rotation about the adjustment axis between the input and output axes to transmit rotation between the input and output shafts.

24. The adjustable angle drive attachment of claim 23 further comprising:
a transmission shaft having a first and second ends earned by the input and output housings, respectively, the transmission shaft supporting the intermediate transmission gear between the first and second ends.

25. The adjustable angle drive attachment of claim 24 wherein the first and second ends of the transmission shaft are journalled to the input and output housings, respectively.

26. The adjustable angle drive attachment of claim 22 further comprising a clamp releasably securing the input and output housings together.

27. The adjustable angle drive attachment of claim 26 wherein the input and output shafts are infinitely adjustable between two angular positions relative to each other.

28. The adjustable angle drive attachment of claim 27 wherein the input shaft and the output shaft are infinitely adjustable between about 90 degrees and about 180 degrees.

29. The adjustable angle drive attachment of claim 26 wherein the clamp is a ring clamp surrounding the circular interface, the ring clamp engaging the input and output housings.

30. The adjustable angle drive attachment of claim 29 further comprising a handle threadingly engaging the ring clamp and being rotatable to adjust the diameter of the ring clamp selectively clamp or release the input and output housings.

31. The adjustable angle attachment drive of claim 30 wherein the ring clamp is rotatable radially about the circular interface adjusting the position of the handle relative to the input and output housings wherein the handle is selectively positionable relative to the output shaft.

32. The adjustable angle drive attachment of claim 22 further comprising a chuck mounted to the output shaft, the chuck having an adjustable orifice adapted to connect to the work tool and other work tools.

33. The adjustable angle drive attachment of claim 22 wherein the output shaft is adjustable relative to the input shaft only about the adjustment axis.

34. The adjustable angle drive attachment of claim 22 wherein the input and output housings are hemispherical shells slidably contacting each other at the circular interface.

* * * * *

UNITED STATES PATENT AND TRADEMARK OFFICE
CERTIFICATE OF CORRECTION

| | | |
|---|---|---|
| PATENT NO. | : 7,191,677 B2 | Page 1 of 1 |
| APPLICATION NO. | : 10/367469 | |
| DATED | : March 20, 2007 | |
| INVENTOR(S) | : Patrick J. Barkdoll | |

It is certified that error appears in the above-identified patent and that said Letters Patent is hereby corrected as shown below:

In Claim 1, Column 5, Line 55, the word "earned" should correctly read --carried--.

In Claim 24, Column 8, Line 45, the word "earned" should correctly read --carried--.

Signed and Sealed this

Twelfth Day of February, 2008

JON W. DUDAS
*Director of the United States Patent and Trademark Office*